United States Patent [19]
Wynn

[11] Patent Number: 5,905,271
[45] Date of Patent: May 18, 1999

[54] INLINE OPTICAL SENSOR WITH VERNIER PATHLENGTH ADJUSTMENT AND PHOTOMETRIC CALIBRATION

[75] Inventor: William H. Wynn, Hillsborough, Calif.

[73] Assignee: Wedgewood Technology, Inc., San Carlos, Calif.

[21] Appl. No.: 08/933,712

[22] Filed: Sep. 19, 1997

[51] Int. Cl.[6] .................................................. G01J 3/50
[52] U.S. Cl. .......................... 250/573; 250/576; 356/413; 356/246; 356/436
[58] Field of Search ................................ 250/573–576; 356/246, 346, 413, 436, 437, 438

[56] References Cited

U.S. PATENT DOCUMENTS

| | | | |
|---|---|---|---|
| 3,622,279 | 11/1971 | Moran | 250/576 |
| 3,833,864 | 9/1974 | Kiess et al. | 250/576 |
| 4,023,909 | 5/1977 | Ross | 356/413 |
| 4,786,171 | 11/1988 | Le Febre et al. | 356/413 |
| 5,407,638 | 4/1995 | Wang | 250/576 |

*Primary Examiner*—Stephone Allen
*Attorney, Agent, or Firm*—Flehr Hohbach Test Albritton & Herbert

[57] ABSTRACT

Inline optical sensor having first and second optically transmissive windows positioned on opposite sides of a product stream. A light source is positioned outside the first window for directing light through the product stream, and the spacing between the windows is adjusted to control the length of an optical path through the product stream. A detector is positioned outside the second window for receiving light passing along the optical path, and a photometric calibration filter is removably installed between the second window and the detector for calibration of the system.

7 Claims, 3 Drawing Sheets

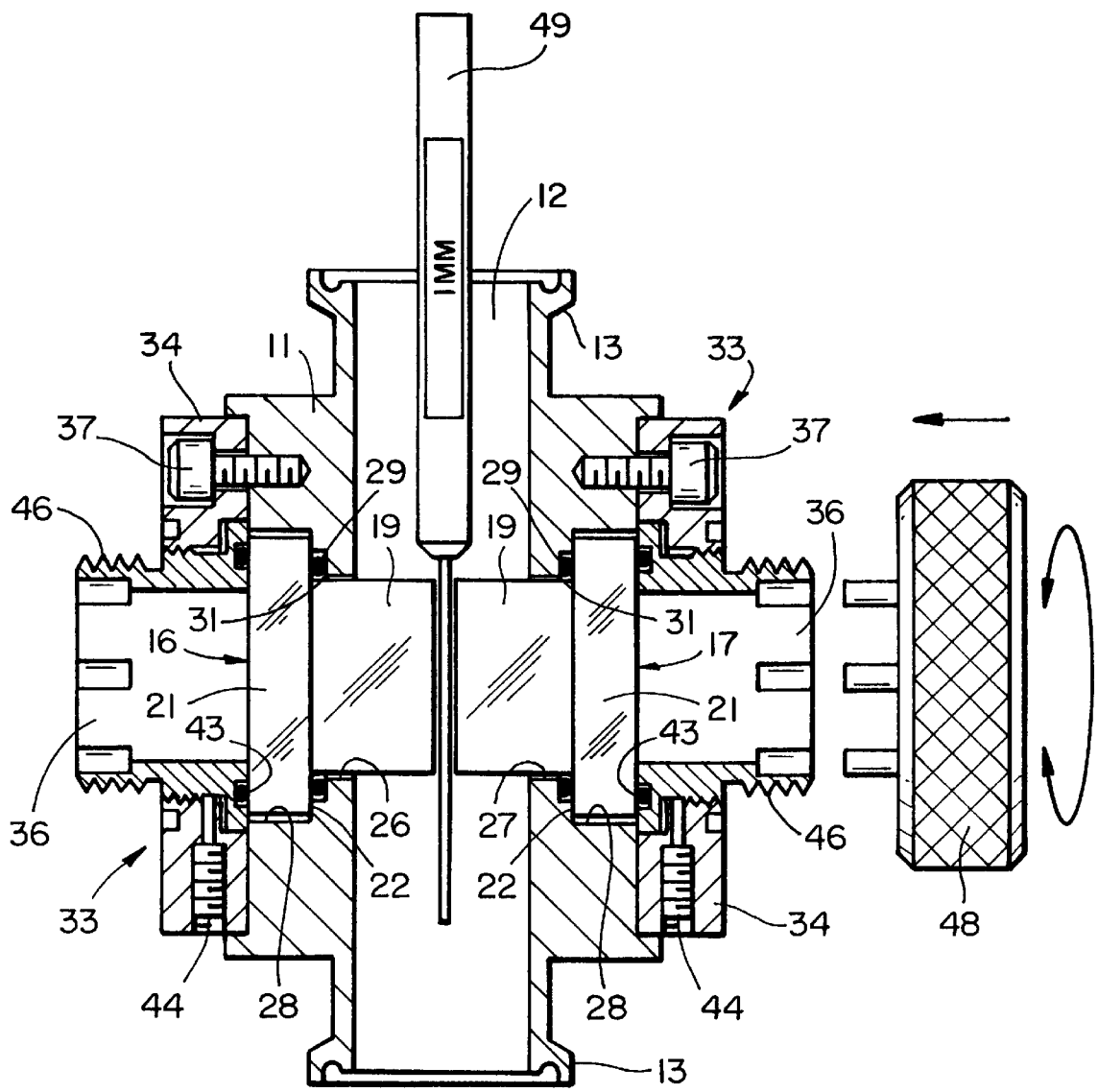
FIG_1

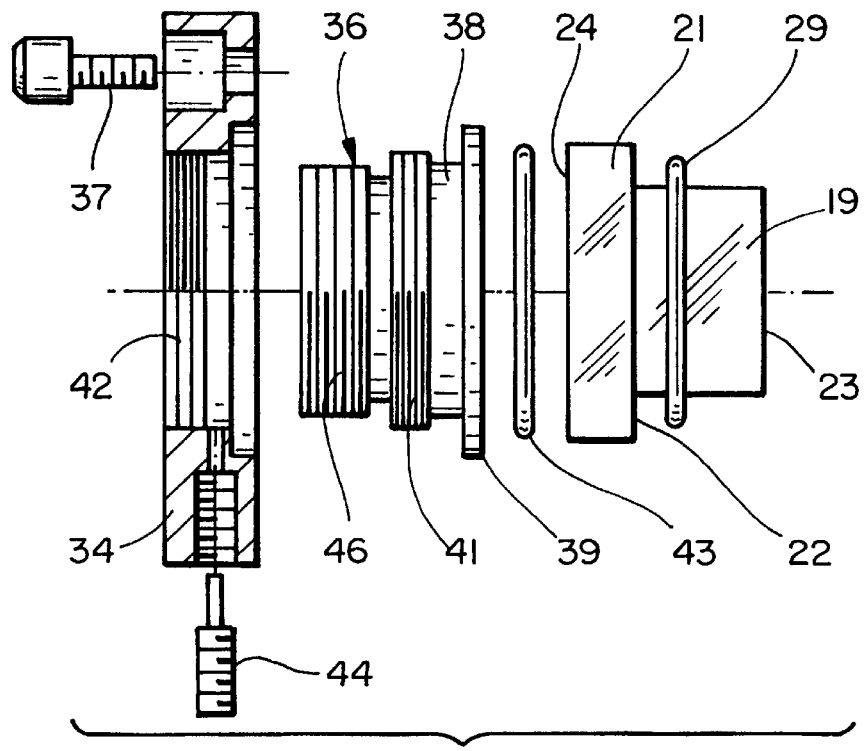
FIG_2
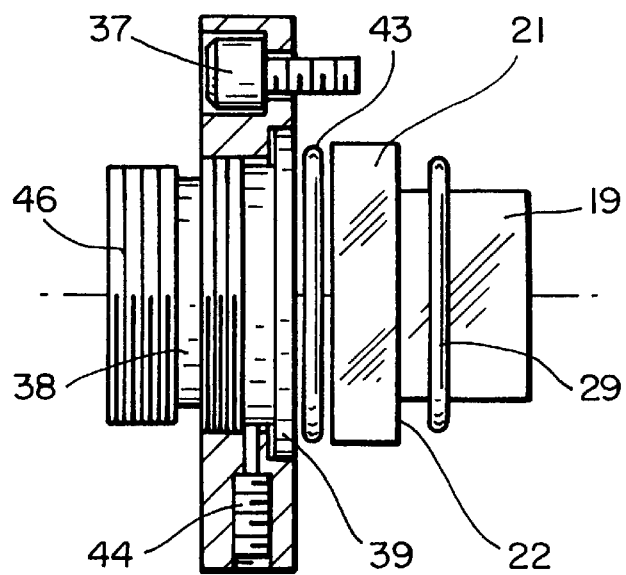
FIG_3

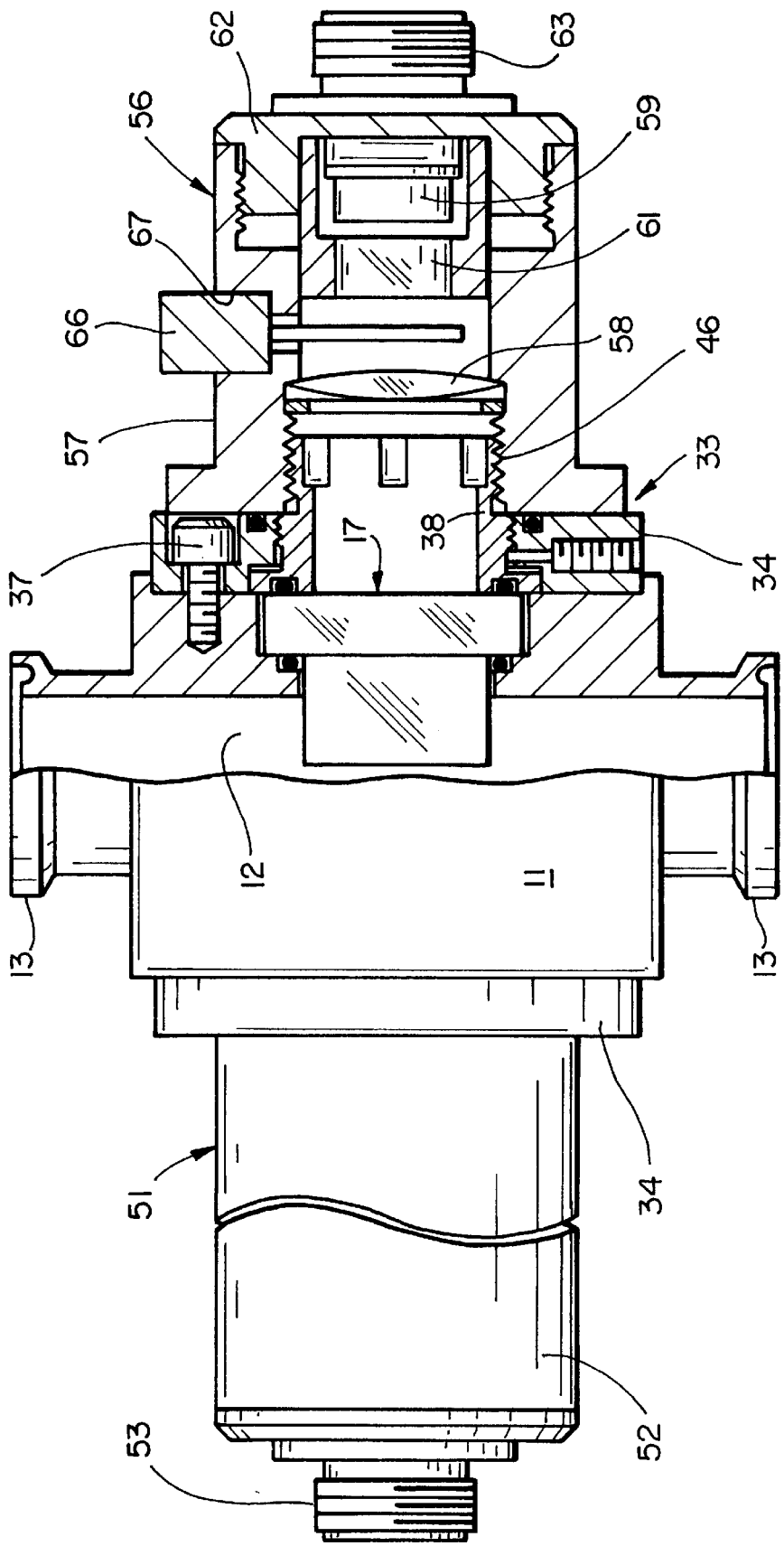
FIG_4

INLINE OPTICAL SENSOR WITH VERNIER PATHLENGTH ADJUSTMENT AND PHOTOMETRIC CALIBRATION

This invention pertains generally to photometric analyzers and, more particularly, to analyzers of the type known as inline optical sensors.

Inline optical sensors are utilized in a wide variety of applications (e.g. spectrophotometers, colorimeters, turbidimeters, refractometers, and ultrasonic flow and particle sensing devices) in which photometric properties of fluid product streams are monitored. Such instruments generally have optical windows positioned on opposite sides of the product stream, with a light source outside one of the windows for directing a beam through the stream and a sensor outside the other for receiving the beam. The light can be in the ultra violet, visible or near infrared spectrums, and the term light is used herein as including all three.

The length of the optical path through the fluid stream is generally determined by the spacing between the windows, and this can be a critical factor to the accuracy of the readings made with the instrument. The windows which are currently available for these instruments are designed for standard pathlengths of 0.5 mm, 1 mm, 2 mm, 5 mm and 10 mm, with a tolerance of +0.05 mm (0.002"), and the accuracy of readings made with the instruments is limited accordingly. O-ring seals for the windows have tolerances on the order of ±0.1 mm (0.004") which further limits the accuracy of the measurements.

Another problem with existing inline photometric analyzers, particularly in the biotech and pharmaceutical fields, is the need to use NIST traceable calibration standards to comply with validation protocols and procedures.

Such standards are typically in the form of filters which are placed between the light source and the detector, and they can cause problems such as distortion of the source beam, increased spacing between the source and the detector, and decreased signal strength at the detector.

It is in general an object of the invention to provide a new and improved inline optical sensor.

Another object of the invention is to provide an optical sensor of the above character which overcomes the limitations and disadvantages of the prior art.

Another object of the invention is to provide an optical sensor of the above character in which the pathlength through the product stream can be precisely adjusted.

Another object of the invention is to provide an optical sensor of the above character in which calibration can be performed without disturbing the normal properties of the system.

These and other objects are achieved in accordance with the invention by providing an inline optical sensor having first and second optically transmissive windows positioned on opposite sides of a product stream, a light source positioned outside the first window for directing light through the product stream, means for adjusting the spacing between the windows to control the length of an optical path through the product stream, a detector positioned outside the second window for receiving light passing along the optical path, and a photometric calibration filter removably installed between the second window and the detector.

FIG. 1 is a vertical sectional view of one embodiment of an inline optical sensor incorporating the invention, with the light source and sensor removed for ease of illustration.

FIG. 2 is an exploded side elevational view, partly broken away, of an adjustable mount for one of the optical windows in the embodiment of FIG. 1.

FIG. 3 side elevational view, partly broken away, of the mount of FIG. 2 in its assembled state.

FIG. 4 is a side elevational view, partly broken away, of the embodiment of FIG. 1 with the light source and sensor in place.

As illustrated in FIG. 1, the optical inline sensor includes a housing 11 with an internal chamber 12 and flanges 13 for connection to piping (not shown) which carries the stream of product to be monitored. Optically transparent entrance and exit windows 16, 17 are provided in the housing on opposite sides of the chamber, and a beam of light is passed through though those windows and the product stream and monitored to determine photometric properties of the product.

Each of the windows has a solid cylindrical inner portion or body 19 of circular cross-section and an outer portion or head 21 of increased diameter at the outer end of the inner portion, with an axially facing annular shoulder 22 on the inner side of the outer portion adjacent to the inner portion. The inner and outer surfaces 23, 24 of the two windows are flat.

The windows are mounted in aligned apertures 26, 27 in the housing walls on opposite sides of chamber 12, with the inner surfaces 23 of the two windows facing each other and defining the length of an optical path through a product stream passing between the windows. The outer portions of the windows are received in outwardly facing recessed areas or counterbores 28 which surround the apertures. Resilient O-ring gaskets 29 are disposed between annular shoulders 22 and the bottom walls 31 of the recessed areas.

Means is provided for adjusting the spacing between the inner faces of the windows and, hence, the length of the optical path through the product stream. This means includes adjustable mounts 33 in which the windows are mounted.

Each of the mounts includes an internally threaded ring 34 and an adjuster body 36 which is rotatively mounted in the ring. The rings are disposed coaxially of the window apertures and affixed to the housing walls by mounting screws 37. Each of the adjuster bodies has a cylindrical side wall 38 with an annular flange 39 at its inner end and an external thread 41 near the flange which engages the internal thread 42 in the mounting ring. Resilient O-rings 43 are disposed between flanges 39 and the outer faces of the windows. Those O-rings are similar to O-rings 29, and a thin film of silicone grease or other suitable lubricant is applied to them. Set screws 44 are provided in rings 34 for locking the adjuster bodies in place once the windows have been adjusted.

A second external thread 46 is provided at the outer end of the side wall of each of the adjuster bodies for attachment of a light source or sensor. Thread 46 is of lesser diameter than thread 41 and passes freely through the ring as the mount is assembled.

The mounts are adjusted by rotating bodies 36 within rings 34, with O-rings 29 being compressed as the windows are moved in an inward direction. Those O-rings also cooperate with O-rings 43 to hold the windows firmly in place between flanges 39 and the bottom walls 31 of recessed areas 28 as the windows are advanced and retracted. The amount of window travel is limited by the compression of the O-rings and is typically on the order of 0.3 mm per window, or 0.6 mm for the two windows.

The adjustment is made by loosening set screws 44 and inserting an adjusting key 48 into the outer end of the adjuster body for the window to be adjusted.

With right-handed threads, rotation of the key in a clockwise direction moves the window in an inward direction, compressing O-ring 29 and decreasing the pathlength; rotation in the counter-clockwise direction allows O-ring 29 to re-expand, thereby retracting the window and increasing the pathlength. Once the adjustment has been made, the set screws are tightened to lock the adjuster body in place.

Rotation of the adjuster bodies provides a vernier adjustment which permits the spacing between the windows, and hence the length of the optical path between the windows, to be set with a high degree of precision. This adjustment is typically made with the aid of a NIST traceable plug gauge 49 which is inserted between the confronting faces of the windows. With the vernier adjustment, the pathlength can be set with an accuracy on the order of 0.005 mm (0.0002"), which is more than an order of magnitude better than the tolerances of inline optical sensors of the prior art.

FIG. 4 illustrates a light source 51 mounted on the entrance side of the instrument. This source includes a lamp and beam forming optics mounted in a cylindrical housing 52, with an electrical connector 53 at the outer end of the housing for supplying power to the lamp. Housing 52 is screwed onto the external thread 46 at the outer end of adjuster body 36, with the light beam provided by the source being directed through the bore in body.

FIG. 4 also illustrates a sensor 56 mounted on the exit side of the instrument. This sensor includes a cylindrical housing 57 which is mounted on the thread at the outer end of adjuster body 36, an objective lens 58, positioned near the outer face of exit window 17, a detector 59 positioned toward the outer end of the housing, and a spectral filter 61 in front of the detector. The detector is mounted on a removable end cap 62 at the outer end of the housing, with an electrical connector 63 for connection with the associated instrumentation (not shown). In some applications, e.g. where the light source provides a prefocused beam, the objective lens is not necessary and can be omitted.

Means is provided for calibrating the photometric response of the sensor to a known NIST traceable optical standard. This means includes a calibration filter 66 which is inserted into the optical path between objective lens 58 and spectral filter 61. The calibration filter is inserted through a port 67 in the side wall of housing 57 which is sealed by a cover plate and gasket (not shown) when the filter is removed. In systems which do not have the objective lens, the calibration filter can still be used and is installed in the same position in front of the detector.

The calibration filter can be either a neutral density filter or a color filter, depending upon the application for which the sensor is to be used. A set of filters having OD values of 0.3, 0.5 and 1.0 will provide an adequate range of calibration for typical applications.

Positioning the calibration filter after the beam forming or collection optics and before the detector and its spectral filter permits the calibration filter to be installed and removed without altering the length of the optical path between the source and the detector. This is important in maintaining the optical geometry of the sensor and minimizing distortion of the light beam. An increase in source to detector spacing would result in degradation of the signal at the sensor.

The location of the calibration filter has a further advantage in that filter can be installed and removed without danger of an explosion in a hazardous environment when the detector itself is intrinsically safe. For that reason, a preferred type of detector for use in the system is a solid state enhanced silicon photocurrent cell, or a solid state photocell. With such a detector, exposure of the interior of the detector housing while changing filters poses no hazard in an explosive environment.

Adjustment and calibration of the sensor are as follows. With the sensor removed from the process line, i.e. no product stream in chamber 12, windows 16, 17 are installed along with their mounts. The windows are then adjusted for the desired pathlength by rotation of adjuster bodies 36, then checked with a plug gauge 49. Generally speaking, this adjustment only needs to be made when the windows and/or the 0-ring gaskets are replaced, or when a different pathlength is desired.

Once the windows have been adjusted, the light source and sensor are installed, and chamber 12 is filled with distilled water. After a suitable warmup period, the instrumentation is zeroed, the cover plate is removed, and calibration filter 66 is installed. The span of the instrument is then set to match the OD value of the filter. Thereafter, the filter is removed, and the cover plate is replaced. This calibration procedure can be performed either with the sensor removed from the product line or with it installed.

The invention has a number of important features and advantages. It permits the optical pathlength through the product stream to be adjusted with a degree of precision which is more than an order of magnitude greater than tolerances of inline optical sensors have previously allowed. It also permits calibration standards to be inserted and removed without disturbing the pathlength of the optical system or degrading the signal from the system.

It is apparent from the foregoing that a new and improved inline optical sensor has been provided. While only certain presently preferred embodiments have been described in detail, as will be apparent to those familiar with the art, certain changes and modifications can be made without departing from the scope of the invention as defined by the following claims.

I claim:

1. In an inline optical sensor: a housing having an internal chamber through which a product stream can flow, first and second optically transmissive windows positioned on opposite sides of the chamber, a light source positioned outside the first window for directing light through the product stream, means for adjusting the spacing between the windows to control the length of an optical path through the product stream, a detector positioned outside the second window for receiving light passing along the optical path, and a photometric calibration filter removably installed between the second window and the detector.

2. The inline optical sensor of claim 1 wherein the means for adjusting the spacing between the windows comprises window mounts with vernier adjusters.

3. The inline optical sensor of claim 2 wherein each of the windows has an inner portion of generally circular cross-section which extends through an aperture in the housing, an outer portion of increased diameter which is received in a recessed area of the housing surrounding the aperture, and a resilient O-ring disposed between the outer portion and a bottom wall of the recessed area, and the vernier adjuster comprises a threaded ring mounted to the housing and a body which is threadedly engaged with the ring for advancing the window in an inward direction to compress the 0-ring upon relative rotation of the body and the ring.

4. The inline optical sensor of claim 1 wherein optical means is disposed between the second window and the detector for directing light passing through the product stream toward the detector, and the calibration filter is positioned between the optical means and the detector.

5. In an inline optical sensor: a housing having an internal chamber through which a product stream can flow, an aperture in the housing on one side of the chamber, a seat surrounding the aperture on the outer side of the housing, an optically transmissive window having an inner portion of generally circular cross-section which extends through the aperture and an outer portion of increased diameter with an annular shoulder facing the seat, a resilient O-ring disposed between the shoulder and the seat, a threaded ring mounted to the housing and disposed coaxially of the aperture, and a body threadedly engaged with the ring for adjusting the position of the window against the resiliency of the O-ring upon relative rotation of the body and the ring.

6. The inline optical sensor of claim 5 including a second O-ring disposed between the body and an outer face of the window.

7. In an inline optical sensor: a housing having an internal chamber through which a product stream can flow, optically transmissive windows, first and second optically transmissive windows positioned on opposite sides of the chamber, a light for directing light through the first window and the product stream, a detector positioned outside the second window for receiving light passing through the product stream, optical means positioned between the second window and the detector for directing the light from the product stream to the detector, and a photometric calibration filter removably mounted between the optical means and the detector.

* * * * *